Feb. 4, 1936.   A. E. COLEMAN   2,029,464
FINGER RING
Filed Feb. 18, 1935
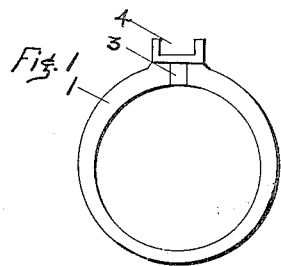
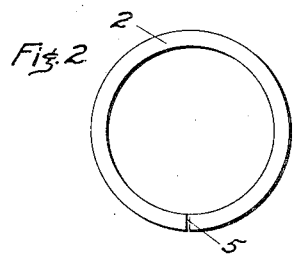
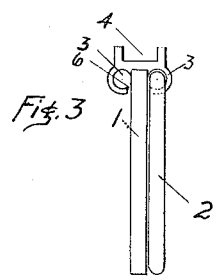
*Alfred E. Coleman*
INVENTOR.

Patented Feb. 4, 1936, 2,029,464

UNITED STATES PATENT OFFICE 2,029,464

FINGER RING

Alfred E. Coleman, Corvallis, Oreg.

Application February 18, 1935, Serial No. 6,923

6 Claims. (Cl. 63—15)

My invention relates to improvement in finger rings in which a primary ring and a secondary ring are so constructed as to admit of being permanently united to form a single unit of jewelry when desired.

I attain this object by the device illustrated in the accompanying drawing in which—

Figure 1 is a side view of the primary ring;
Figure 2 is a side view of the secondary ring;
Figure 3 is an edge view of the complete unit.

Similar numerals refer to similar parts throughout the several views.

The primary ring 1 may be of the customary form of an engagement ring with a jewel mounting or crown 4, or it may carry a lodge emblem or seal. In addition thereto an eyelet 3, is attached through which the secondary ring 2, can be inserted. Secondary ring 2, is provided with an open joint 5, which can be spread apart so as to allow the ring to be inserted and then closed.

If, for any reason it is not desired to have this open joint 5, I provide a joint 6, so the eyelet 3, may be forced open enough to allow the secondary ring to be slipped into place and secured by closing the eyelet.

This secondary ring may be any form as a wedding ring or carry the emblem of any lodge or order as desired and the two rings when so joined will be in effect a single unit as shown in Fig. 3.

In the practical application of my invention I do not propose to be limited to the particular form set forth in the foregoing specifications but reserve the right to vary the form, number, or position of the several parts as may be found desirable without departing from, or exceeding the scope of my invention.

I claim:

1. Two rings joined together by insertion of one ring in an opening provided in a projection in the side of the other ring and held together in a position parallel and in juxtaposition with each other by means of this opening.

2. A primary ring adapted to form part of a twin ring structure defined in part as a circlet portion, a crown portion and a projection adjacent said crown portion, an aperture formed in said projection, said aperture being adapted to contain a secondary ring in parallel relationship to said primary ring and in juxtaposition thereto.

3. A primary ring as characterized in claim 2 in which equal and opposite projections are formed on the crown.

4. A twin ring structure comprising a primary ring, a crown on said primary ring, a projection adjacent said crown, an aperture through said projection that is adapted to movably contain a secondary ring and a secondary ring in said aperture, the said aperture being so positioned that the axes of the rings are in substantial coincidence.

5. A twin ring structure as characterized in claim 4 and including means for inserting the secondary ring in the aperture after the rings are manufactured.

6. A twin ring structure defined in part as a master ring, a crown portion thereof, equal and opposite projections on the crown portion, apertures in said projections, said apertures being adapted to selectively contain a companion ring in parallel relationship to said master ring and movable with respect thereto.

ALFRED E. COLEMAN.